United States Patent Office 2,898,381
Patented Aug. 4, 1959

2,898,381

STYRENE DERIVATIVES AND PROCESS FOR PREPARING SAME

Samuel W. Tinsley, South Charleston, W. Va., assignor to Union Carbide Corporation, a corporation of New York No Drawing. Application December 5, 1955
Serial No. 550,853

11 Claims. (Cl. 260—646)

This invention relates to a process of preparing styrene derivatives that are useful as herbicides, fungicides and as intermediates in the preparation of an antibiotic preparation, as well as to novel derivatives so prepared.

p-Nitroacetophenone and p-nitrophenacyl chloride, two of the styrene derivatives obtainable by the method of the invention, are both useful in the synthesis of 1-p-nitrophenyl-2-dichloroacetoamido-1,3-propanediol having the formula:

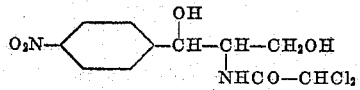

also known as "Chloromycetin" and as chloramphenicol, the recently recommended international non-proprietary name for this antibiotic. The preparation of chloramphenicol from p-nitroacetophenone is well known to those skilled in the art and is described, for example, in vol. 71 of The Journal of the American Chemical Society (1949), at page 2473. Other derivatives, such as p-nitrostyrene dichloride and nitro-1,2,2-trichloroethylbenzenes are valuable as herbicides, and still others, such as p-nitro-1,2-dichlorostyrene, are valuable as soil fungicides and as pesticides.

Generally, the method of the invention comprises nitrating styrene chlorinated in the ethene group, dehydrochlorinating the nitrated product, and hydrolyzing the product of dehydrochlorination to produce nitroacetophenone and nitrophenacyl chloride.

In accordance with the invention, styrene is first chlorinated with an excess of chlorine to form a mixture of styrene dichloride and 1,2,2-trichloroethylbenzene. This is accomplished by dissolving the styrene in a suitable inert solvent such as carbon tetrachloride and bubbling chlorine gas through the solution. The excess chlorine, based on the amount required to form styrene dichloride, is sufficient in this step to convert the beta-chlorostyrene otherwise formed as a by-product into 1,2,2-trichloroethylbenzene so as to form a mixture of the dichloride and the 1,2,2-trichloroethylbenzene.

To obtain substantially pure p-nitroacetophenone and p-nitrophenacyl chloride, the two chlorination products are separated before further treatment. This may be accomplished by any suitable means, e.g., by fractional distillation, the dichloride having an average boiling point of about 90° C. at 5 mm. while the trichloro fraction has an average boiling point of about 103° C. at 5 mm. Separation at this point avoids a much more difficult separation of the nitrated products at a later stage and also facilitates isolation of pure chemical intermediates that are valuable for other uses.

The nitration of styrene dichloride and 1,2,2-trichloroethylbenzene may be carried out by any of the methods well known to those skilled in the art. For optimum yields, the nitration is preferably accomplished by reaction with a mixed acid comprising about one part by weight nitric acid to two parts by weight of sulfuric acid. This is most desirably carried out at low temperature in order to favor formation of the para-isomers, discourage ortho-isomer formation and further to avoid oxidation. A nitration temperature below about 0° C. is preferable. p-Nitrostyrene dichloride can be separated from the crude nitration make of styrene dichloride by low temperature crystallization and the remaining oily mixture of isomers can be carried through the other steps of the method to give a final product from which additional p-nitroacetophenone can be frozen out. The nitro-1,2,2-trichloroethylbenzene can be separated into the isomers by low temperature crystallization after dehydrochlorination or after hydrolysis.

The dehydrochlorination that follows the nitration is carried out with the assistance of any strong base, potassium and sodium hydroxides being preferred. In this step of the process the temperature is not particularly critical, variations from room temperature to the boiling point being permissible.

The product or products of the dehydrochlorination are then subjected to hydrolysis, preferably by the use of concentrated sulfuric acid. While the concentration of the acid used in the hydrolysis step may be varied considerably, it has generally been advantageous to use concentrations between about 80 and 96%, lower concentrations requiring longer time and higher concentrations resulting in somewhat lower yields despite the good rate of hydrolysis obtained.

The method of the invention may be graphically illustrated as follows:

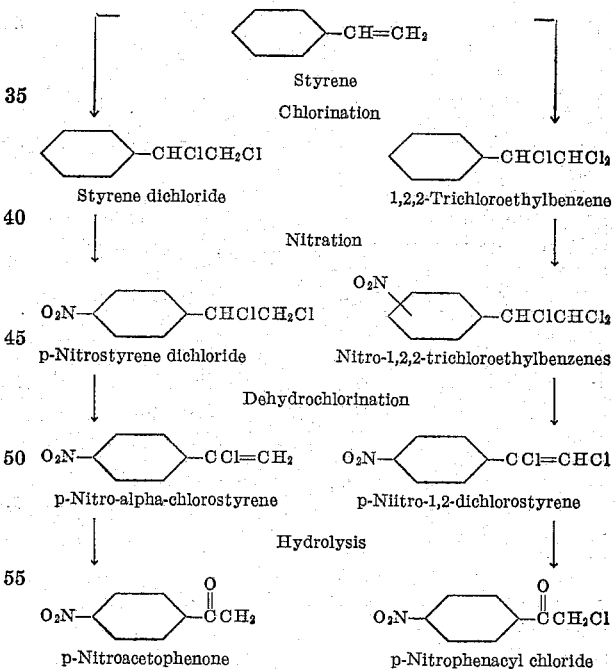

The simplicity and the short time required for performing the method, the ready availability and comparative inexpensiveness of the initial materials employed, and the good yields obtainable are among the most important advantages of the method of this invention. With this invention, for example, there is no necessity for excessively close control over the amount of chlorine reacted with the styrene. Such control was hitherto thought necessary in order to avoid the formation of beta-chlorostyrene as a troublesome by-product. By the method of the invention, the formation of beta-chlorostyrene is avoided by the use of excess chlorine so as to form 1,2,2-trichloroethylbenzene instead, thus avoiding the disadvantages incurred by polymerization of beta-chlorostyrene on the walls, valves and other parts of the processing apparatus. Another advantage of the method of the invention is that the styrene dichloride and the 1,2,2-trichloroethylbenzene are both useful in the preparation of chloramphenicol and other intermediates and that they can be readily separated, if desired.

These and other advantages, as well as the utility of the invention, will become apparent from the more detailed description in the following example, which is included to illustrate the best modes now contemplated of practicing the invention.

*Example*

520 grams of styrene were dissolved in 500 ml. of carbon tetrachloride and 420 grams of chlorine were bubbled through the solution while it was maintained at a temperature of 0° C. The resulting mixture was then subjected to fractionation to separate the styrene dichloride from the 1,2,2-trichloroethylbenzene.

*Part A.*—A nitrating mixture of 270 grams of fuming nitric acid and 540 grams concentrated sulfuric acid was added as rapidly as possible to 462 grams of the styrene dichloride fraction, initially cooled to −10° C., while keeping the temperature below −5° C. After the addition was completed, the solution was poured onto ice for separation into layers. The lower layer was dissolved in 600 grams of methanol and cooled to −15° C. Crystalline p-nitrostyrene dichloride was removed by filtration and found to weigh 275 grams (a yield of 47.5%). The pure material was found to have a melting point of 53° C. The non-crystalline portion of the product also weighed 275 grams, thus giving a total yield of 95% for crude mixed nitrostyrene dichlorides.

A slurry of 120 grams of p-nitrostyrene dichloride in 120 ml. of methanol and 250 ml. of 10% sodium hydroxide was warmed at 60° C. for one hour, cooled and filtered. A 100% yield (101 grams) of p-nitro-alpha-chlorostyrene having a melting point of 63° C. was obtained.

Twenty grams of the p-nitro-alpha-chlorostyrene were added in small increments to 100 grams of 91% sulfuric acid at room temperature. The solution was stirred for about three to four hours until no more hydrogen chloride was evolved, poured onto ice and filtered. Seventeen grams (94% yield) of crude p-nitroacetophenone having a melting point of 72–74° C. were obtained. Thirteen grams (72% yield) of purified p-nitroacetophenone were obtained by crystallization from methanol.

It was found that additional p-nitroacetophenone was obtainable by subjecting the oily residue from the p-nitrostyrene dichloride crystallization to the above reaction sequence. Dehydrochlorination and hydrolysis of 220 grams of the oily fraction and final distillation under vacuum yielded 31 grams (19%) of purified p-nitroacetophenone from the distillate on cooling.

*Part B.*—225 grams of the 1,2,2-trichloroethylbenzene fraction were nitrated by cooling the trichloroethylbenzene to −10° C. and adding thereto, as rapidly as possible while maintaining the temperature below −5° C., a nitrating mixture of 90 grams of fuming nitric acid and 180 grams concentrated sulfuric acid. 225 grams (93% yield) of nitro-1,2,2-trichloroethylbenzene isomers, primarily o- and p-isomers, were obtained. A sample of this isomer mixture was found to have a boiling point of 130° C. at about 0.5 mm. Hg and an index of refraction $n_D^{30}$ of 1.5827.

A solution of 21 grams of sodium hydroxide in 140 ml. methanol was then added to 127 grams of the nitrated product. The mixture was brought to the boiling point and the salt precipitated was removed by filtration. The filtrate was evaporated and cooled to yield 49 grams (45% yield) of p-nitro-1,2-dichlorostyrene having a melting point of 40–50° C. It was found that this material could be resolved into two components, one melting at 76° C. and the other at 37–39° C. Inasmuch as both components gave the same analysis and the same product on hydrolysis, they are believed to be cis- and trans-isomers of the compound.

Ten grams of p-nitro-1,2-dichlorostyrene were added to 80 ml. concentrated sulfuric acid and the solution was warmed at 60° C. until no more hydrogen chloride was evolved. The solution was then poured onto ice and filtered. Nine grams of crude product were obtained. The crystallization thereof from methanol yielded 7.5 grams (83% yield) of purified p-nitrophenacyl chloride having a melting point of 100–101° C.

Biological tests have shown that p-nitrostyrene dichloride and the nitro-1,2,2-trichloroethylbenzenes are valuable as general herbicides for such uses as the control of vegetation on roadways, railroad rights of way, airstrips, and the like. It was found, for example, that the spraying of typical test plants with 0.1% solutions of these products resulted in killing the plants within ten days.

Further tests demonstrated that p-nitro-1,2-dichlorostyrene is a valuable soil fungicide useful in the control of damping off diseases which occur while seeds are germinating and also as a pesticide that is useful in the control of aphids, spider mites and the like. In one series of tests, for example, soil infested with Pythium, a damping off organism, was treated with p-nitro-1,2-dichlorostyrene at a rate of 150 pounds per acre and planted with pea seeds. On plots so treated, an 84% stand of plants resulted whereas on untreated control plots there were stands of less than 20%. In another series of tests, nasturtium plants infested with approximately 100 bean aphids per plant were sprayed at 40 p.s.i. pressure with 80 ml. of a solution having a concentration of 250 mg. p-nitro-1,2-dichlorostyrene per 100 ml. of water. The stands were then held at 75–80° F. and at a humidity of 40–70% for twenty-four hours. Mortality counts were taken and it was found that the p-nitro-1,2-dichlorostyrene had controlled over 50% of the bean aphids as compared with untreated control plants, and that the composition was non-toxic to the foliage of plants.

It is to be expected that many modifications will readily become apparent to those skilled in the art upon reading this description. All such modifications are intended to be included within the scope of the invention as defined in the accompanying claims.

I claim:

1. The process of preparing p-nitrostyrene dichloride which comprises nitrating styrene dichloride at a temperature below about 0° C.

2. The process of preparing p-nitrostyrene dichloride which comprises nitrating styrene dichloride at a temperature below about 0° C. and separating the p-nitrostyrene dichloride from isomers thereof by low temperature crystallization.

3. The process of preparing p-nitro-alpha-chlorostyrene which comprises nitrating styrene dichloride at a temperature below about 0° C. and dehydrochlorinating the nitrated product in the presence of a strong alcoholic base selected from the group consisting of potassium hydroxide and sodium hydroxide.

4. The process of preparing p-nitroacetophenone which comprises nitrating styrene dichloride at a temperature below about 0° C., dehydrochlorinating the nitrated product in the presence of a strong alcoholic base selected from the group consisting of potassium hydroxide and sodium hydroxide, and hydrolyzing it with concentrated sulfuric acid.

5. The process of preparing p-nitroacetophenone which comprises nitrating styrene dichloride at a temperature below about 0° C., dehydrochlorinating the nitrated product in the presence of a strong alcoholic base selected from the group consisting of potassium hydroxide and sodium hydroxide, and hydrolyzing it with sulfuric acid having a concentration between about 80 and 96%.

6. The process of preparing nitro-1,2,2-trichloroethylbenzenes which comprises nitrating 1,2,2-trichloroethylbenzene at a temperature below about 0° C.

7. The process of preparing p-nitro-1,2-dichlorostyrene which comprises nitrating 1,2,2-trichloroethylbenzene at a temperature below about 0° C. and dehydrochlorinating the nitrated product in the presence of a strong alcoholic base selected from the group consisting of potassium hydroxide and sodium hydroxide.

8. The process of preparing p-nitrophenacyl chloride which comprises nitrating 1,2,2-trichloroethylbenzene at a temperature below about 0° C., dehydrochlorinating the nitrated product in the presence of a strong alcoholic base selected from the group consisting of potassium hydroxide and sodium hydroxide, and hydrolyzing it with concentrated sulfuric acid.

9. The process of preparing p-nitrophenacyl chloride which comprises nitrating 1,2,2-trichloroethylbenzene at a temperature below about 0° C., dehydrochlorinating the nitrated product in the presence of a strong alcoholic base selected from the group consisting of potassium hydroxide and sodium hydroxide, and hydrolyzing it with sulfuric acid having a concentration between about 80 and 96%.

10. The process of preparing p-nitroacetophenone which comprises hydrolyzing p-nitro-alpha-chlorostyrene with concentrated sulfuric acid.

11. The process of preparing p-nitroacetophenone which comprises dehydrochlorinating p-nitro-1,2-dichloroethylbenzene in the presence of a strong alcoholic base selected from the group consisting of potassium hydroxide and sodium hydroxide, and hydrolyzing the resulting p-nitro-alpha-chlorostyrene with concentrated sulfuric acid.

References Cited in the file of this patent

UNITED STATES PATENTS

| | | |
|---|---|---|
| 2,189,570 | Schechter | Feb. 6, 1940 |
| 2,237,284 | Alquist | Apr. 8, 1941 |
| 2,462,346 | Barrick | Feb. 22, 1949 |
| 2,511,915 | Himel | June 20, 1950 |
| 2,582,114 | Frisch | Jan. 8, 1952 |
| 2,762,848 | Johnson | Sept. 11, 1956 |